United States Patent [19]

Greer et al.

[11] Patent Number: 4,949,655

[45] Date of Patent: Aug. 21, 1990

[54] PROCESS FOR THE UTILIZATION OF POWDERED SOLID WASTE

[76] Inventors: Fred C. Greer, 2020 Creekway, Lansdale, Pa. 19446; Allan S. Paul, 238 6th Avenue, Collegeville, Pa. 19426

[21] Appl. No.: 311,836

[22] Filed: Feb. 17, 1989

[51] Int. Cl.$^5$ .............................................. F23G 7/04
[52] U.S. Cl. ................................... 110/346; 110/221; 110/225; 110/238
[58] Field of Search ................. 110/238, 225, 221, 346

[56] References Cited

U.S. PATENT DOCUMENTS

| | | | |
|---|---|---|---|
| 3,718,102 | 2/1973 | Hemsath et al. | 110/238 |
| 3,894,833 | 7/1975 | Rinecker | 110/238 X |
| 4,311,103 | 1/1982 | Hirose | 110/238 |
| 4,388,875 | 6/1983 | Hirose | 110/221 X |
| 4,481,890 | 11/1984 | Lewis | 110/225 |
| 4,769,157 | 9/1988 | Bassler et al. | 210/758 |
| 4,787,323 | 11/1988 | Beer et al. | 110/238 X |

*Primary Examiner*—Edward G. Favors
*Attorney, Agent, or Firm*—Marshall, O'Toole, Gerstein, Murray & Bicknell

[57] ABSTRACT

This invention encompasses a process for the utilization of dried powdered waste as a fuel, in particular, dried powdered aqueous waste. The object of the invention is to eliminate the use of conventional auxiliary fuel to aid in thermal oxidation of waste materials containing a high percentage of water in relation to solids, thus improving the total efficiency of the process. The problems associated with handling the waste products are solved along with the expense of using conventional auxiliary fuels such as gas and fuel oils.

3 Claims, 2 Drawing Sheets

PROCESS FOR THE UTILIZATION OF POWDERED SOLID WASTE

FIELD OF THE INVENTION

This invention relates to a process for the thermal disposal of aqueous waste sludges produced by domestic and industrial waste water treatment.

BACKGROUND OF THE INVENTION

Since the first multiple hearth incinerator for the oxidation of sludge was installed in the United States in 1935, many municipalities have used multiple hearth incineration as a thermal reduction process prior to final disposal of waste. Since 1935, over three hundred of these units have been installed in the United States. These furnaces have handled a large variation in feed quality and loading rates.

In the conventional multiple hearth unit, the sludge cake enters the top of a cylindrical furnace and is moved from hearth to hearth through the furnace by a series of rabble arms extending from a center shaft along the full height of the furnace. Minimally, three functional zones exist in the furnace: (1) the upper part of the furnace evaporates the water contained in the sludge waste, resulting in a flue gas exit temperature of between 800° F. to 1000° F., (2) combustion occurs in the middle sections of the furnace with temperatures typically in the range of 1400° F. to 1600° F., and (3) the resulting ash is then cooled in the bottom of the furnace prior to being discharged. Presently, close to 75% of these incinerators have been closed down due to the following reasons: (a) increased sludge production, (b) a lowering of cake solids due to secondary treatment, (c) the ever increasing price of energy, and (d) the necessity of afterburning in order to meet air emission standards. All of these requirements are causing the cost for conventional incineration to dramatically increase and are forcing new incineration technology and process development.

SUMMARY OF THE INVENTION

The present invention discloses a process for utilizing the waste product, itself, as fuel. The waste product is introduced to preselected areas of a furnace by a mechanism that conveys and efficiently distributes the dried waste in a manner to insure good combustion and temperature profile, thus solving the problems stated above. This process will allow most of the shut down multiple hearth incinerators to be retrofitted and put back into use, as well as influence future design of new sludge incineration processes.

The present invention encompasses a process for the thermal oxidation of aqueous waste materials comprising: dewatering said waste; transporting said waste to a sludge feed hopper; drying a portion of waste from said hopper wherein the amount of said waste dried is sufficient to support autogenous combustion in a primary combustion system transporting said dried waste to said primary combustion system and; oxidizing said waste.

It is an object of the invention to provide a materials that have been subject to mechanical dewatering and partially dried in an indirect steam dryer or air dryer. The resulting powdered fuel can be used as an auxiliary fuel to eliminate the use of conventional fuel or for recovering energy for use in auxiliary purposes such as hot water or steam generation.

It is an advantage of the invention to use dried waste sludge to be fired in suspension to replace and perform the function of a burner fuel for increasing temperatures in afterburning operations or for use for firing in a chamber that has been designed to burn conventional fuels for other purposes.

The introduction of the powdered product into the furnace through a modified dual fuel burner insures the most economical method for complete oxidation of the waste product.

BRIEF DESCRIPTION OF THE DRAWINGS

A schematic diagram illustrating the flow of the dried waste according to the present invention is shown in FIG. 1. A burner suitable for use with dried waste is shown in FIG. 2.

DETAILED DESCRIPTION OF THE DRAWINGS

Figure 1:
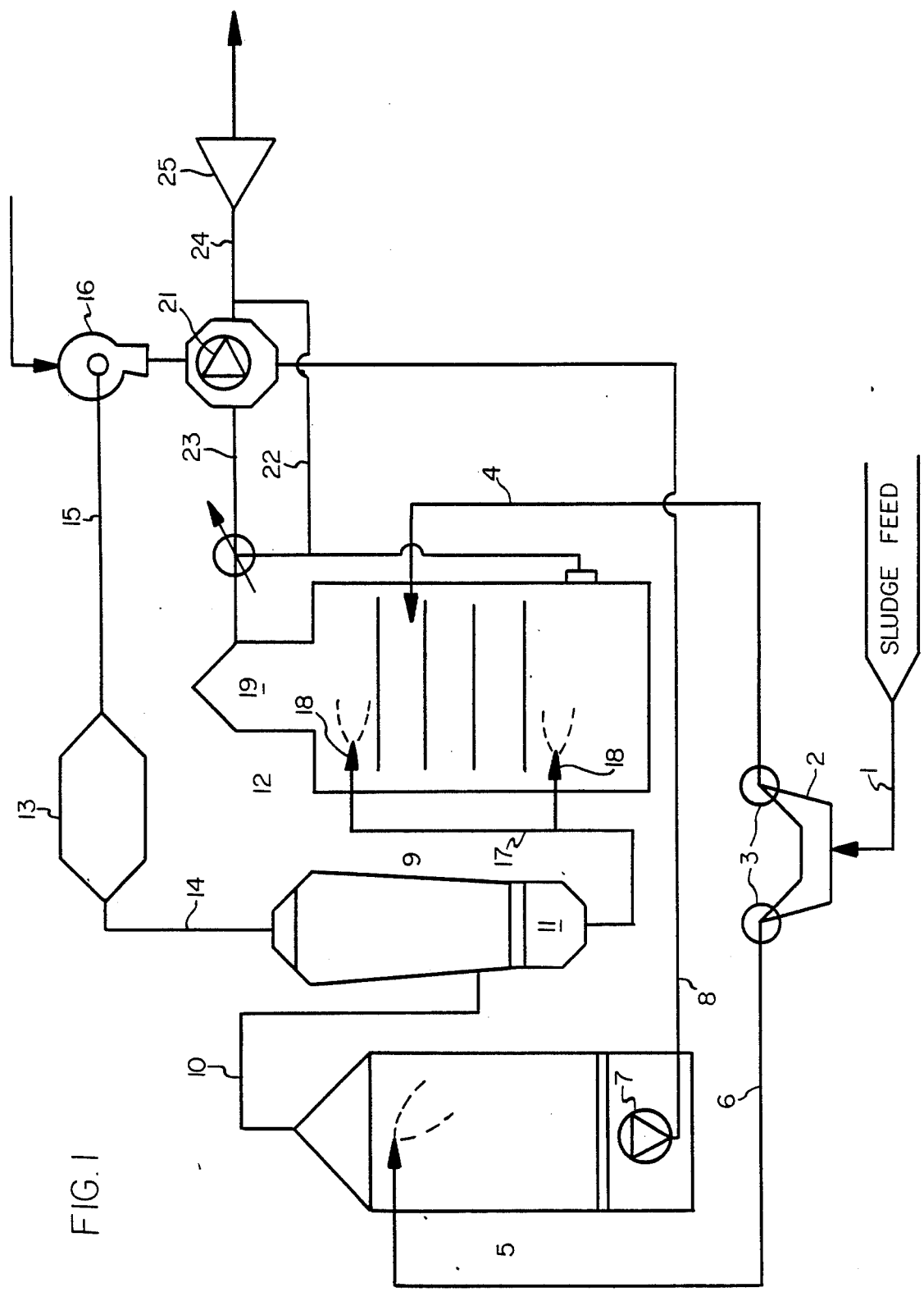

The sludge is mechanically dewatered and fed by means of a pump or conveyor, through conduit 1, to a sludge feed hopper 2. At this stage, the sludge will contain a sludge cake solids content of approximately 20% solids. By a predetermined heat and material balance of the waste process, the amount of volatile solids necessary to obtain an autogenous mixture in the furnace will be readily calculated. Using these calculations, the amount of the sludge feed to be separated and dried before introduction into the multiple hearth will be determined. The multiple hearth furnace will be designed or modified to eliminate the conventional conveyor belt top feed system to a feed system using screw pumps 3. These pumps will discharge the waste product into hearth 1 of the multiple hearth incinerator, through conduit 4. This feed method serves two purposes. First, it eliminates the introduction of uncontrolled air when the conventional flap gate or slide gate is opened to feed the sludge cake to the furnace. Second, it allows for a zero hearth to be constructed on top of the furnace to act as an afterburner to provide a way to increase the flue gas temperature to a range which satisfies air emission regulations. The waste sludge stream is transported to the dryer 5 through conduit 6.

The dryer shown in FIG. 1 for the above process can be either an indirect steam type dryer in which energy is returned from the multiple hearth furnace flue gas and used in the dryer in the form of steam or a fluidized bed type dryer in which the multiple hearth flue gas is passed through an air-to-air heat exchanger as shown. When applying either type of dryer to this process, it is necessary to control the temperature in order to prevent distillation of volatiles from the dried sludge cake. This is accomplished in either type of dryer by the proper temperature control and the appropriate retention time in the dryer. Retention time is also used to control the particle size of the dried sludge. Preferably, the size of the particle is less than about 200 mesh. In the fluid bed dryer, both retention time and particle size are affected by the space velocity which is also controlled to insure a high quality waste fuel. Space velocity is the number of feet per second that a particle will travel in a given space. For the fluidized bed dryer above, the space velocity is preferably between about 2.5 to about 6 feet per second.

In a preferred embodiment of the present invention, the dewatered sludge cake is fed to a fluidized bed dryer by means of a pump where it enters through the top of the dryer and is sprayed into the dryer bed. The fluidized bed media is typically sand, which is fluidized by introduction of preheated fluidizing air. The fluidizing ambient air stream is transported by conduit 8 through a suitable air-to-air heat exchanger 7, where the air used to fluidize the bed is heated and introduced into the windbox of the dryer. The dryer is designed to operate at a temperature of approximately 200° F. to 250° F. The temperature of the fluidizing air and the sludge feed to the dryer will be regulated in order to control the temperature of the fluidized bed. The space velocity of the particles is also regulated to control the particle retention time in the dryer. The dried sludge powder is carried from the fluidized bed dryer to a cyclone 9 for particle entrainment from the exhaust gas stream through conduit 10. To accomplish the entrainment, the gas stream exits the dryer and is introduced into a cyclone where the particles are separated. The cyclone is equipped with an airlock feeder system 11 for transport of the powdered fuel to the multiple hearth furnace 12. The exhaust gas, now deplete of solids, is then introduced into a condenser 13 through conduit 14 which removes water from the air stream and which then drains from the system. Finally, the saturated air stream is transported through conduit 15 back to the multiple hearth furnace where it can be used for cooling purposes or it can be sent back to the intake of the dryer air blower 16 for injection back into the drying process.

In order to eliminate the post mixing of powdered solid waste fuel with the incoming sludge cake which would create many additional material handling problems, this process preferably pneumatically transports the dried powdered solid fuel through conduit 17 by a header system to special dual fuel burners 18 where the waste fuel is fired in suspension. Preferably, the special burners are adapted to be mounted in a minimum of two locations within a multiple hearth furnace. The first location will be in the burning zone of the furnace, and the second location will be in the afterburning zone. The amount of waste powdered fuel transported to the burning zone will be regulated to establish temperature control and autogenous burning. The powdered waste fuel introduced to the zero hearth will be regulated to control flue gas temperatures as required to meet regulatory requirements where higher temperatures are required for the exiting flue gas. Extra retention time can be designed into the system by means of an afterburner extension 19. The multiple hearth flue gas exits the afterburner extension through conduit 20 and either passes by or is directed through the air to air heat exchanger 21 for the sludge dryer through conduits 22 or 23.

Finally, the flue gas is passed through conduit 24 a conventional venturi scrubbing system 25 before it is released to the atmosphere.

Figure 2:
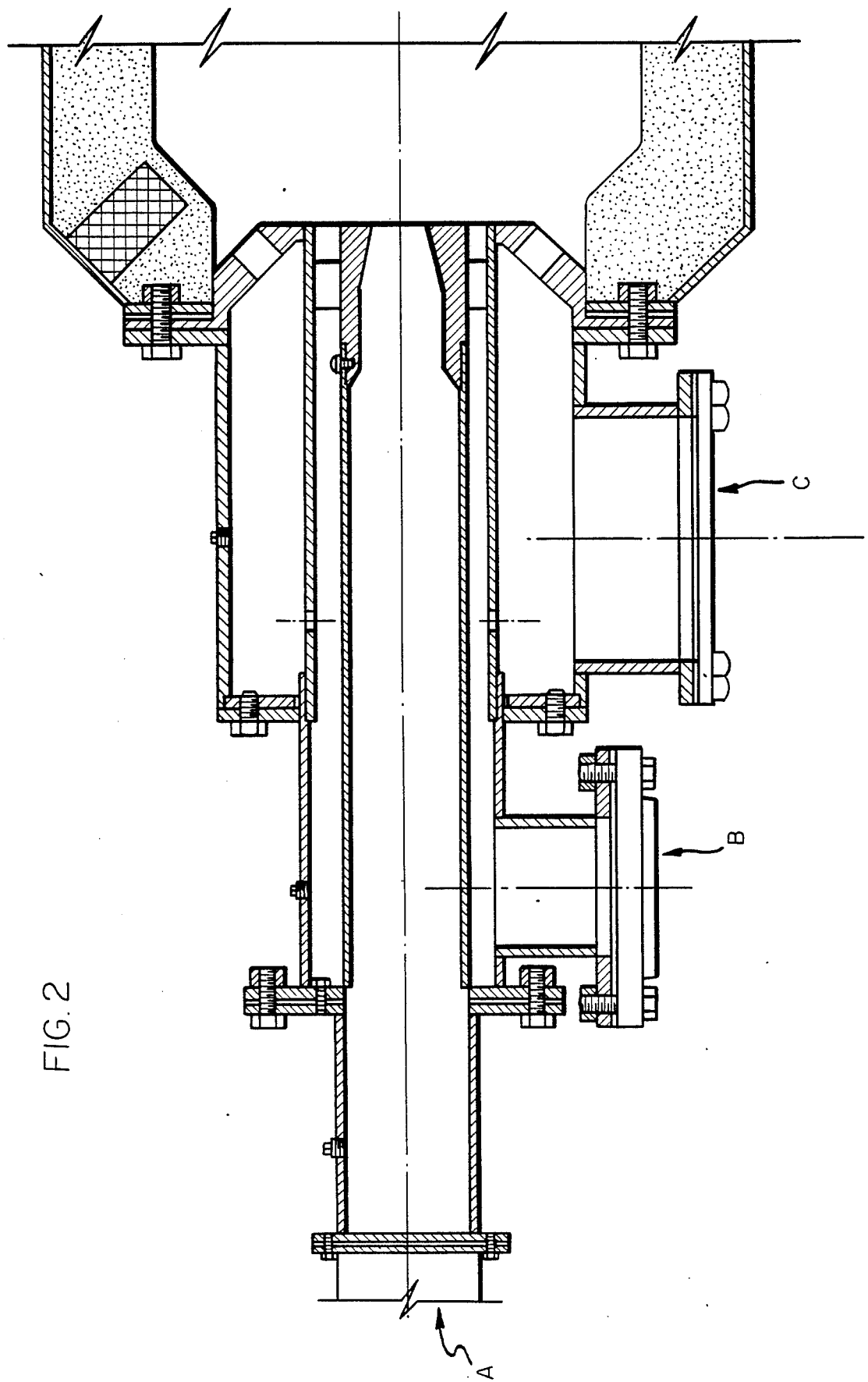

A preferred burner for use in a multiple hearth furnace to burn dried waste is shown in FIG. 2. The dual fuel burner has three entry ports.

Entry port (A) receives the powdered waste fuel which can be supplied by means of an induction system. The supply pressure will range from less than about one (1) psi to as high as above five (5) psi, depending on the amount of waste fired and the supply system. The powdered fuel can travel down the center firing tube of the burner and be discharged into a refractory throat in the burner in a whirling motion.

Entry port (B) is the natural gas/L.P. gas or digester gas entry port. The gas fuel can be supplied in pressures of three to five psi, depending on the quantity of fuel required. These fuels may be fired in conjunction with or independent of the powdered waste fuel. The gaseous fuel will travel through a tubular section surrounding the powdered fuel tube and will be discharged into the same refractory throat through specially designed orifices.

Entry port (C) is a combustion air port. Combustion air can be made available at pressures of about fifteen to about seventy five pounds per square inch, depending on the fuel requirements.

The combustion air supplied to the burners can be ambient air supplied by turbo-type blowers in quantities calculated according to the total amount of fuel to be fired. The recommended combustion air quantity would be calculated at 125% of the stoichiometric requirement.

We claim:

1. A process for the thermal oxidation of aqueous waste materials as a replacement for auxiliary fuel comprising:
   (i) dewatering the waste;
   (ii) transporting the waste to a sludge feed hopper;
   (iii) drying a portion of the waste from the hopper wherein the amount of the waste dried is sufficient to support autogenous combustion in a multiple hearth furnace having a plurality of hearths;
   (iv) pneumatically transporting the dried waste to multiple locations within the multiple hearth furnace; and,
   (v) oxidizing the waste particles wherein the waste is fired in suspension.

2. The process according to claim 1 wherein the dried waste is added to the multiple hearth furnace at the zero hearth and at the fourth hearth.

3. The process according to claim 2, wherein the dried waste added at the zero hearth controls the temperature of exiting flue gas.

* * * * *

UNITED STATES PATENT AND TRADEMARK OFFICE
CERTIFICATE OF CORRECTION

PATENT NO. : 4,949,655

DATED : August 21, 1990

INVENTOR(S) : Greer et al.

It is certified that error appears in the above-identified patent and that said Letters Patent is hereby corrected as shown below:

Col. 1, line 60, "provide a materials" should be --provide a process for the thermal oxidation of aqueous waste materials--.

Signed and Sealed this

Twelfth Day of November, 1991

Attest:

HARRY F. MANBECK, JR.

Attesting Officer

Commissioner of Patents and Trademarks